US008194034B2

(12) United States Patent
Bucchieri

(10) Patent No.: US 8,194,034 B2
(45) Date of Patent: Jun. 5, 2012

(54) SYSTEMS AND METHODS FOR CONTROLLING A DISPLAY

(75) Inventor: Vittorio Bucchieri, Wakefield, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 799 days.

(21) Appl. No.: 11/613,657

(22) Filed: Dec. 20, 2006

(65) Prior Publication Data

US 2008/0151125 A1 Jun. 26, 2008

(51) Int. Cl.
*G09G 5/00* (2006.01)

(52) U.S. Cl. .......................................... 345/156; 725/40

(58) Field of Classification Search .................. None
See application file for complete search history.

(56) References Cited

U.S. PATENT DOCUMENTS

| | | | |
|---|---|---|---|
| 4,977,455 A | 12/1990 | Young | |
| 5,151,789 A | 9/1992 | Young | |
| 5,253,066 A | 10/1993 | Vogel | |
| 5,307,173 A | 4/1994 | Yuen et al. | |
| 5,335,079 A | 8/1994 | Yuen et al. | |
| 5,353,121 A | 10/1994 | Young et al. | |
| 5,382,983 A | 1/1995 | Kwoh et al. | |
| 5,479,266 A | 12/1995 | Young et al. | |
| 5,479,268 A | 12/1995 | Young et al. | |
| 5,499,103 A | 3/1996 | Mankovitz | |
| 5,512,963 A | 4/1996 | Mankovitz | |
| 5,515,173 A | 5/1996 | Mankovitz et al. | |
| 5,532,732 A | 7/1996 | Yuen et al. | |
| 5,532,754 A | 7/1996 | Young et al. | |
| 5,539,478 A * | 7/1996 | Bertram et al. | 348/734 |
| 5,541,738 A | 7/1996 | Mankovitz | |
| 5,550,576 A | 8/1996 | Klosterman | |
| 5,553,123 A | 9/1996 | Chan et al. | |
| 5,559,550 A | 9/1996 | Mankovitz | |
| 5,600,711 A | 2/1997 | Yuen | |
| 5,619,274 A | 4/1997 | Roop et al. | |
| 5,640,484 A | 6/1997 | Mankovitz | |
| 5,684,525 A | 11/1997 | Klosterman | |
| 5,701,383 A | 12/1997 | Russo et al. | |
| 5,706,145 A | 1/1998 | Hindman et al. | |
| 5,727,060 A | 3/1998 | Young | |
| 5,734,786 A | 3/1998 | Mankovitz | |
| 5,790,198 A | 8/1998 | Roop et al. | |
| 5,793,438 A * | 8/1998 | Bedard | 725/43 |
| 5,801,787 A | 9/1998 | Schein et al. | |
| 5,808,608 A | 9/1998 | Young et al. | |
| 5,809,204 A | 9/1998 | Young et al. | |
| 5,812,205 A | 9/1998 | Milnes et al. | |
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |

(Continued)

*Primary Examiner* — Amare Mengistu
*Assistant Examiner* — Antonio Xavier

(57) ABSTRACT

An apparatus is provided for controlling a display. The apparatus is moveable by an individual user and includes a motion sensor for detecting and providing an indication of one or more types of movement of the apparatus. The apparatus also includes a transmitter, which is configured to receive the indication of movement, either directly or indirectly, from the motion sensor. The transmitter is further configured to transmit at least one signal based on movement of the apparatus which is configured to initiate display changes in data displayed in a remote display device. A system and a method for controlling a display are also provided.

19 Claims, 9 Drawing Sheets

U.S. PATENT DOCUMENTS

| Patent | Kind | Date | Inventor | Ref |
|---|---|---|---|---|
| 5,959,688 | A | 9/1999 | Schein et al. | |
| 5,969,748 | A | 10/1999 | Casement et al. | |
| 5,970,206 | A | 10/1999 | Yuen et al. | |
| 5,974,222 | A | 10/1999 | Yuen et al. | |
| 5,987,213 | A | 11/1999 | Mankovitz et al. | |
| 5,988,078 | A | 11/1999 | Levine | |
| 5,991,498 | A | 11/1999 | Young | |
| 6,002,394 | A | 12/1999 | Schein et al. | |
| 6,016,141 | A | 1/2000 | Knudson et al. | |
| 6,028,599 | A | 2/2000 | Yuen et al. | |
| 6,049,652 | A | 4/2000 | Yuen et al. | |
| 6,052,145 | A | 4/2000 | Macrae et al. | |
| 6,072,983 | A | 6/2000 | Klosterman | |
| 6,075,551 | A | 6/2000 | Berezowski et al. | |
| 6,075,575 | A | 6/2000 | Schein et al. | |
| 6,078,348 | A | 6/2000 | Klosterman et al. | |
| 6,091,882 | A | 7/2000 | Yuen et al. | |
| 6,118,492 | A | 9/2000 | Milnes et al. | |
| 6,133,909 | A | 10/2000 | Schein et al. | |
| 6,137,950 | A | 10/2000 | Yuen | |
| 6,144,401 | A | 11/2000 | Casement et al. | |
| 6,151,059 | A | 11/2000 | Schein et al. | |
| 6,167,188 | A | 12/2000 | Young et al. | |
| 6,177,931 | B1 | 1/2001 | Alexander et al. | |
| 6,216,265 | B1 | 4/2001 | Roop et al. | |
| 6,239,794 | B1 | 5/2001 | Yuen et al. | |
| 6,247,176 | B1 | 6/2001 | Schein et al. | |
| 6,262,722 | B1 | 7/2001 | Allison et al. | |
| 6,263,501 | B1 | 7/2001 | Schein et al. | |
| 6,323,911 | B1 | 11/2001 | Schein et al. | |
| 6,341,195 | B1 | 1/2002 | Mankovitz et al. | |
| 6,341,374 | B2 | 1/2002 | Schein et al. | |
| 6,380,967 | B1* | 4/2002 | Sacca | 348/14.01 |
| 6,388,714 | B1 | 5/2002 | Schein et al. | |
| 6,396,546 | B1 | 5/2002 | Alten et al. | |
| 6,412,110 | B1 | 6/2002 | Schein et al. | |
| 6,430,358 | B1 | 8/2002 | Yuen et al. | |
| 6,430,359 | B1 | 8/2002 | Yuen et al. | |
| 6,453,471 | B1* | 9/2002 | Klosterman | 725/41 |
| 6,460,181 | B1 | 10/2002 | Donnelly | |
| 6,466,734 | B2 | 10/2002 | Yuen et al. | |
| 6,469,753 | B1 | 10/2002 | Klosterman et al. | |
| 6,477,705 | B1 | 11/2002 | Yuen et al. | |
| 6,498,895 | B2 | 12/2002 | Young et al. | |
| 6,505,348 | B1 | 1/2003 | Knowles et al. | |
| 6,538,701 | B1 | 3/2003 | Yuen | |
| 6,549,719 | B2 | 4/2003 | Mankovitz | |
| 6,564,379 | B1 | 5/2003 | Knudson et al. | |
| 6,567,606 | B2 | 5/2003 | Milnes et al. | |
| 6,577,350 | B1* | 6/2003 | Proehl et al. | 348/564 |
| 6,588,013 | B1 | 7/2003 | Lumley et al. | |
| 6,603,420 | B1* | 8/2003 | Lu | 341/176 |
| 6,668,133 | B2 | 12/2003 | Yuen et al. | |
| 6,687,906 | B1 | 2/2004 | Yuen et al. | |
| 6,732,369 | B1 | 5/2004 | Schein et al. | |
| 6,742,183 | B1 | 5/2004 | Reynolds et al. | |
| 6,745,391 | B1 | 6/2004 | Macrae et al. | |
| 6,756,997 | B1 | 6/2004 | Ward et al. | |
| 6,760,537 | B2 | 7/2004 | Mankovitz | |
| 6,781,638 | B1* | 8/2004 | Hayes | 348/734 |
| 6,799,326 | B2 | 9/2004 | Boylan et al. | |
| 6,799,327 | B1 | 9/2004 | Reynolds et al. | |
| 6,850,693 | B2 | 2/2005 | Young et al. | |
| 6,859,799 | B1 | 2/2005 | Yuen | |
| 7,006,881 | B1* | 2/2006 | Hoffberg et al. | 700/83 |
| 7,039,935 | B2 | 5/2006 | Knudson et al. | |
| 7,069,576 | B1 | 6/2006 | Knudson et al. | |
| 7,487,529 | B1 | 2/2009 | Orlick | |
| 2001/0029610 | A1 | 10/2001 | Corvin et al. | |
| 2001/0047298 | A1 | 11/2001 | Moore et al. | |
| 2001/0054181 | A1 | 12/2001 | Corvin | |
| 2002/0047894 | A1* | 4/2002 | Steading et al. | 348/44 |
| 2002/0073424 | A1 | 6/2002 | Ward et al. | |
| 2002/0124255 | A1 | 9/2002 | Reichardt et al. | |
| 2003/0005445 | A1 | 1/2003 | Schein et al. | |
| 2003/0011636 | A1* | 1/2003 | Feroglia et al. | 345/767 |
| 2003/0052921 | A1* | 3/2003 | Ulrich et al. | 345/765 |
| 2003/0056219 | A1 | 3/2003 | Reichardt et al. | |
| 2003/0110495 | A1 | 6/2003 | Bennington et al. | |
| 2003/0110499 | A1 | 6/2003 | Knudson et al. | |
| 2003/0115599 | A1 | 6/2003 | Bennington et al. | |
| 2003/0115602 | A1 | 6/2003 | Knee et al. | |
| 2003/0117427 | A1* | 6/2003 | Haughawout et al. | 345/710 |
| 2003/0163813 | A1 | 8/2003 | Klosterman et al. | |
| 2003/0164858 | A1 | 9/2003 | Klosterman et al. | |
| 2003/0188310 | A1 | 10/2003 | Klosterman et al. | |
| 2003/0188311 | A1 | 10/2003 | Yuen et al. | |
| 2003/0196201 | A1 | 10/2003 | Schein et al. | |
| 2003/0204847 | A1 | 10/2003 | Ellis et al. | |
| 2003/0208756 | A1 | 11/2003 | Macrae et al. | |
| 2004/0010806 | A1 | 1/2004 | Yuen et al. | |
| 2004/0045025 | A1 | 3/2004 | Ward et al. | |
| 2004/0046789 | A1* | 3/2004 | Inanoria | 345/748 |
| 2004/0107437 | A1 | 6/2004 | Reichardt et al. | |
| 2004/0168189 | A1 | 8/2004 | Reynolds et al. | |
| 2004/0194138 | A1 | 9/2004 | Boylan et al. | |
| 2004/0237108 | A1* | 11/2004 | Drazin et al. | 725/56 |
| 2004/0261040 | A1* | 12/2004 | Radcliffe et al. | 715/840 |
| 2004/0261098 | A1 | 12/2004 | Macrae et al. | |
| 2005/0010949 | A1 | 1/2005 | Ward et al. | |
| 2005/0028201 | A1 | 2/2005 | Klosterman et al. | |
| 2005/0073497 | A1 | 4/2005 | Kim | |
| 2005/0083426 | A1* | 4/2005 | Yoo et al. | 348/333.05 |
| 2005/0125823 | A1 | 6/2005 | McCoy et al. | |
| 2005/0125826 | A1* | 6/2005 | Hunleth et al. | 725/45 |
| 2005/0149964 | A1 | 7/2005 | Thomas et al. | |
| 2005/0155056 | A1 | 7/2005 | Knee et al. | |
| 2005/0174324 | A1* | 8/2005 | Liberty et al. | 345/156 |
| 2005/0216936 | A1 | 9/2005 | Knudson et al. | |
| 2005/0251824 | A1 | 11/2005 | Thomas et al. | |
| 2006/0156336 | A1 | 7/2006 | Knudson et al. | |
| 2006/0212894 | A1 | 9/2006 | Knudson et al. | |
| 2006/0277574 | A1 | 12/2006 | Schein et al. | |
| 2006/0288366 | A1 | 12/2006 | Boylan et al. | |
| 2007/0016926 | A1 | 1/2007 | Ward et al. | |
| 2007/0033613 | A1 | 2/2007 | Ward et al. | |
| 2007/0107010 | A1 | 5/2007 | Jolna et al. | |
| 2007/0240077 | A1* | 10/2007 | McCarthy et al. | 715/802 |

* cited by examiner

FIG. 1
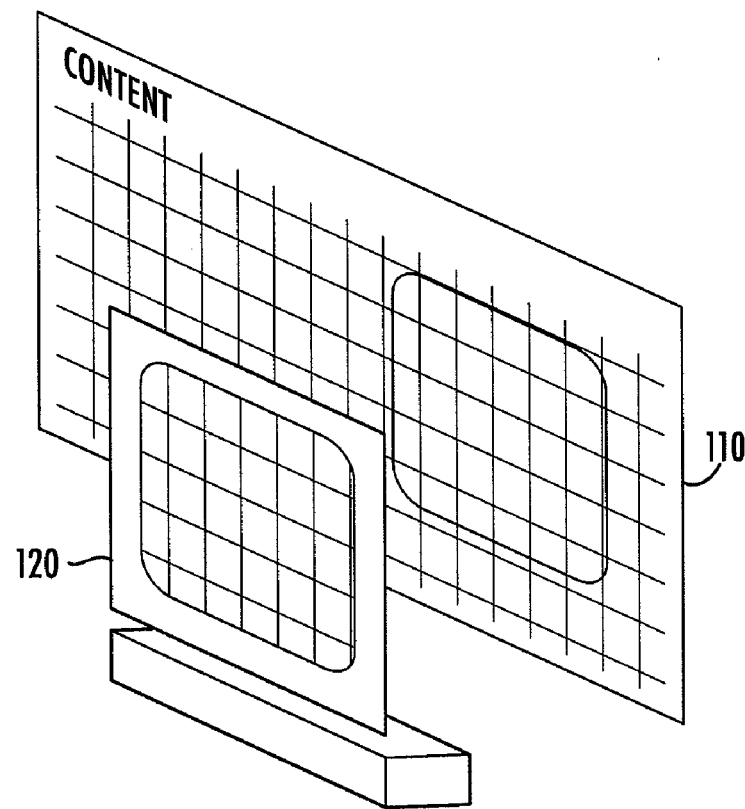
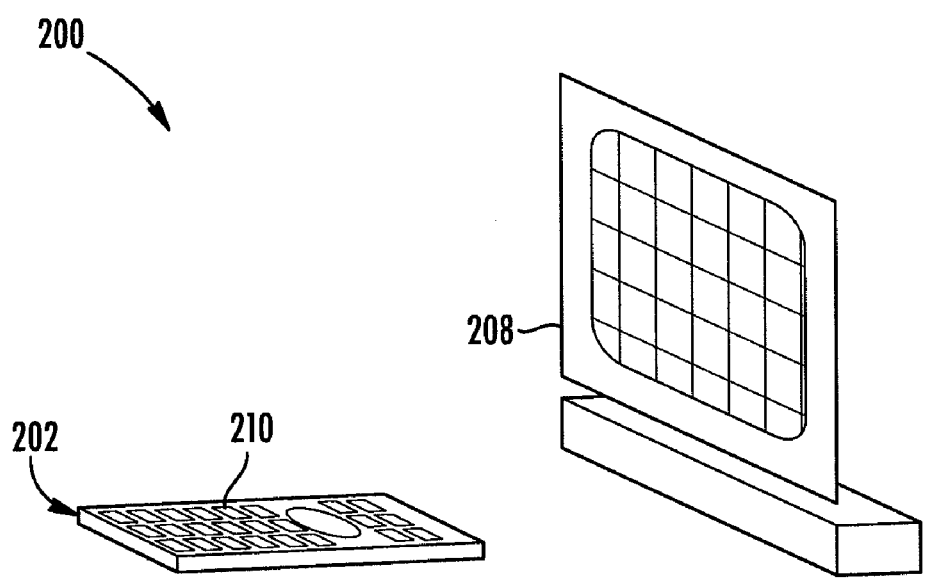
FIG. 2

SYSTEMS AND METHODS FOR CONTROLLING A DISPLAY

BACKGROUND INFORMATION

Programming guides, such as television programming guides for display on a television and the like, are common. These guides usually allow access to hour-by-hour programming information over an extended period of time, often on the order of weeks. In light of this fact, as well as the fact that many conventional television services providers provide an extensive number of channels for viewing, it is apparent that television programming guides, when considered in total, may contain a significant amount of information regarding programming schedules. In addition, many guides now make available detailed information about specific programs, thereby multiplying the total amount of information available through a program guide.

Designers of program guides and guide display schemes are faced with the challenge of creating systems and displays through which a user might easily manage and access the vast amounts of available information. A common method is to associate the information with a time and channel, and to display the information within a two-dimensional array with channels running serially along one (usually horizontal) axis and time running sequentially along a perpendicular (usually vertical) axis. However, the amount of intelligible information that can feasibly be displayed on a television screen is primarily determined by the minimum font size that can be reasonably viewed at a normal viewing distance, and in many applications cannot be smaller than 18 points (as a basis for comparison, the average font size of printed content is usually between 9 and 11 points). For a conventional television, this factor restricts the content that can be displayed to approximately 40 text characters per line and not more than 25 lines per display. Generally, this is significantly less display capability than what is required to display all of the information contained in a program guide at any one time. As such, only a limited portion of the array is typically displayed at any one time, thereby allowing the displayed portion to be of a magnitude reasonably sufficient for viewing.

In order to access the undisplayed portions of the guide, guide users are typically provided with a remote control device that includes four directional buttons for scrolling horizontally and vertically through the array. This system might be visualized as shown in FIG. 1, in which the entire array 110 of information is laid out and a smaller window 120, through which the array is viewed, is moved in front of the array. Typically, this scrolling is accomplished by moving in single time/channel steps through the guide, or be incrementing or decrementing the time/channel in discrete amounts. In addition, many remote controls additionally include the ability to enter specific channel numbers to be displayed, such that a portion of the array containing the specified channel and channels nearby is displayed. By either method, the ability to search for specific information within the entire array is limited, and browsing through program guides can be tedious and time consuming.

BRIEF DESCRIPTION OF THE SEVERAL VIEWS OF THE DRAWING(S)

FIG. 1 depicts a display system consistent with exemplary embodiments.

FIG. 2 is a schematic view of a display system configured in accordance with an exemplary embodiment.

FIG. 6a is a schematic perspective view of a television including an exemplary map for locating the position of displayed data within data available for display.

DETAILED DESCRIPTION

Exemplary embodiments now will be described more fully hereinafter with reference to the accompanying drawings, in which exemplary embodiments and examples are shown. Like numbers refer to like elements throughout.

Referring again to FIG. 1, therein is shown a conceptual representation of an exemplary scheme for displaying content, in this case presented in the form of an array 110. Array 110 may represent, for example, all of the data available for presentation. Less than the full array 110 may be displayed in display device 120, for example, because the magnification of the content is large enough that only a portion of the total available content can be displayed. To then access the undisplayed portions of array 110, a different portion of array 110 may be summoned for display in device 120. Conceptually, this scheme may be equivalent to a movement of the array 110 relative to display device 120.

Figure 3:
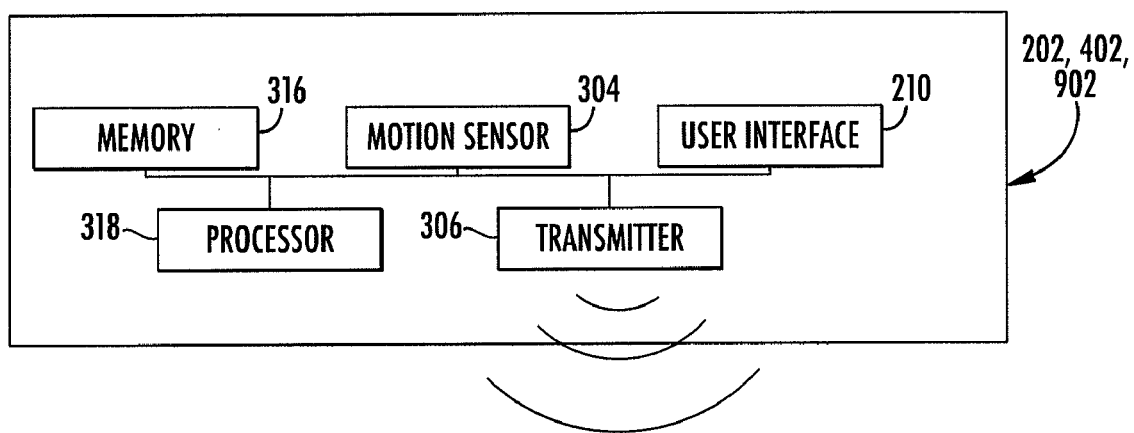
FIG. 3 is a block diagram of the remote control of FIG. 2.

Referring to FIGS. 2 and 3, therein is shown a display system 200 configured in accordance with an exemplary embodiment. System 200 includes an apparatus for controlling a display, for example, a remote control 202. Remote control 202 includes a motion sensor 304 that detects motion of the remote control 202 and provides an indication of that movement. For example, motion sensor 304 might include a series of accelerometers for detecting acceleration of remote control 202 in various directions, each of the accelerometers being configured to output an electrical signal (e.g., a current) proportional to the acceleration in a certain direction. Alternatively, motion sensor 304 may include a signal transceiver for interacting with a transponder to determine position and/or movement. Motion sensor 304 may also include a system that emits signals and determines position based on receiving reflections of such signals. In yet another embodiment, motion sensor 304 may include a geomagnetic sensor.

In one embodiment, the motion sensor 304 includes one or more gyroscopes. The gyroscope can be used to measure the movement of the remote control 202, such as by measuring the angular velocity/rotation of the remote control 202 about one or more axes. In general, the gyroscope or gyroscopes can be arranged, for example, to form a gyro-compass, an inertial navigation system, or some other arrangement that allows position to be detected based on gyroscope movement. The gyroscope may be combined, in some cases, with a distance sensor.

Remote control 202 may also include a transmitter 306. The transmitter 306 can be configured to receive, either directly from motion sensor 304 or indirectly via other components (such as signal conditioners and/or a processor) indications of one or more types of movement of remote control 202. Transmitter 306 may then transmit a signal, based on the detected movement of the remote control 202, that is configured to initiate display changes in data displayed in a remote display device, such as a television 208, as described in more detail below. Remote control 202 may also include a user interface 210, possibly including a keypad or other dedicated buttons (e.g., volume buttons) and the like.

Remote control 202 may satisfy a variety of functional needs via movement based controls. For example, remote control 202 can be configured to transmit a signal that causes television 208, say, to turn off when remote control 202 is turned sideways. Alternatively, remote control may emit a signal that, for example, causes the channel of the television 208 to change to the next higher channel when, say, remote control 202 is flipped upward. Other functions of television 208 (or some other display device) may be controlled via movement of remote control 202, such as modifying the volume or modifying the brightness or contrast of the image. In each of these cases, motion sensor 304 may detect the movement and send a signal representative thereof to, say, a processor 318. The processor 318 may receive the signal and send it (or a representative thereof) to transmitter 306 for transmission to a television/television controller. The processor 318 may be configured to condition or adjust the signal received from the sensor 304 before passing such signal to transmitter 306 in a way that renders the signal appropriate for the transmitter 306, the external device (e.g., such as television 208) that will receive the signal transmitted from the transmitter 306, or both.

Figure 4:
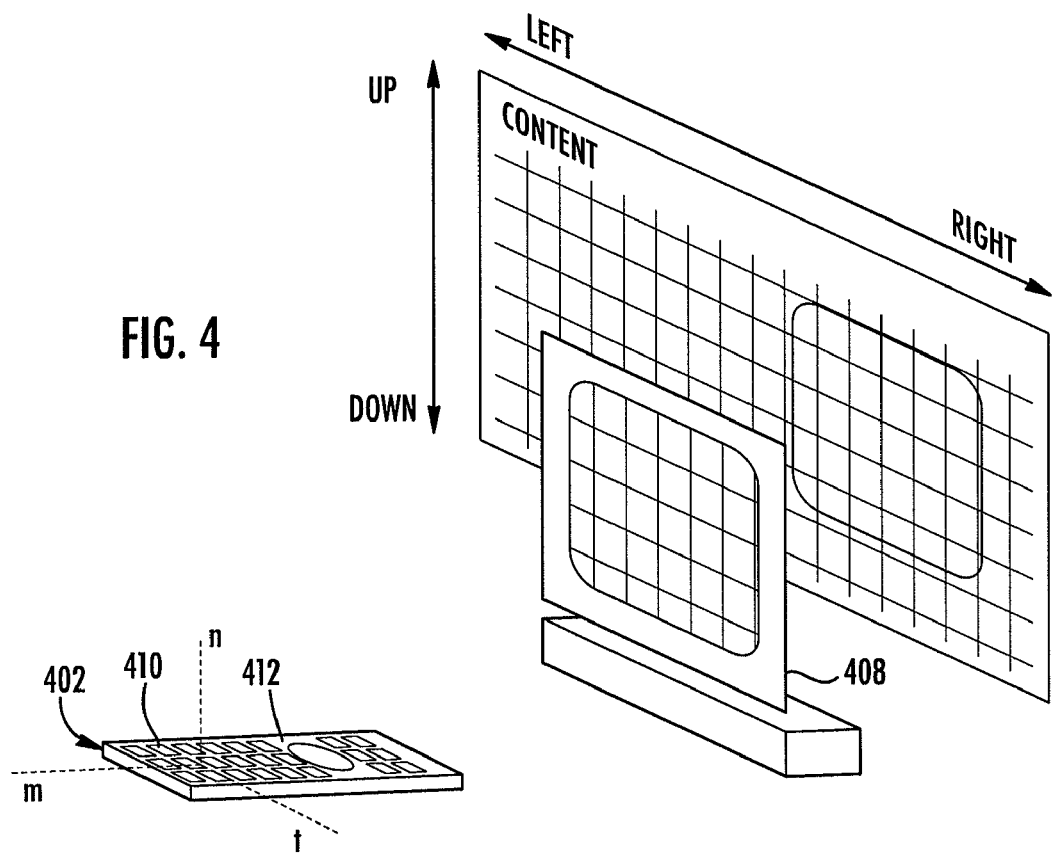
FIG. 4 is a perspective schematic view of the display system of FIG. 2, illustrating one possible relationship between remote control movement and display modification according to exemplary embodiments.

Referring to FIGS. 3 and 4, in one embodiment, remote control 402 may define a main axis m that runs along the length of remote control 402 and a transverse axis t that is perpendicular to main axis m and generally in the plane roughly defined by the upper surface 412 (the surface, e.g., including user interface 410) of remote control 402. A normal axis n can then be defined as the axis that is perpendicular to both main axis m and transverse axis t. A user of remote control 402 might manually position remote control 402 such that main axis m points toward television 408, and transverse axis t and normal axis n define a plane that is roughly parallel with the screen of television 408. Remote control 402 may be configured such that transmitter 306, perhaps in conjunction with a processor 318, transmits a first signal that causes television 408 to translate data displayed on television 408 (e.g., a programming guide) in a first lateral direction (e.g., up or down as defined with respect to television 408) in response to rotation of remote control 402 around the transverse axis t, such rotation being detected and indicated by motion sensor 304. Remote control 402 may be further configured such that transmitter 306 transmits a second signal that causes television 408 to translate displayed data in a second lateral direction (e.g., left or right as defined with respect to television 408) in response to rotation of remote control 402 around normal axis n. Remote control 402 may be still further configured such that transmitter 306 transmits a third signal causing television 408 to change a magnification of the displayed data in response to translation of the remote control 402 along main axis m.

Figure 5A:
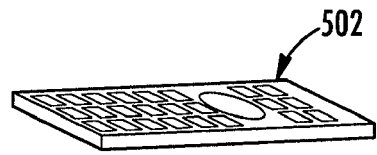
FIGS. 5a-5d are schematic perspective views of display systems, the systems being configured in accordance with exemplary embodiments.
Figure 5B:
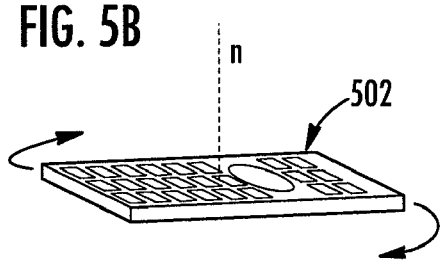
Figure 5C:
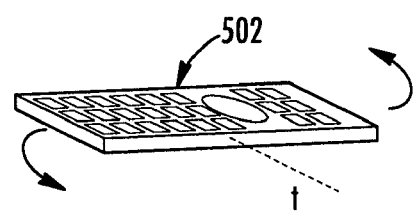
Figure 5D:
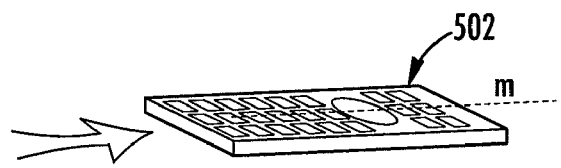

An example of the above described scheme for controlling display data is now described in conjunction with FIGS. 5a-5d. In FIG. 5a, content is displayed on a display device 508. The content is represented by a grid, with each of the columns of the grid labeled with sequential numerals and each of the rows of the grid labeled sequentially by number. It is understood that the entirety of data available for presentation extends beyond the data displayed in device 508. In FIG. 5b, remote control 502 has been rotated about n, and the content has shifted in the display to simulate a leftward movement of the grid relative to device 508. In FIG. 5c, remote control 502 has been rotated about t, and the content has shifted in the display to simulate a downward movement of the grid relative to device 508. Finally, in FIG. 5d, remote control 502 has been translated along m and toward display, and the content appears to have been magnified, such that less of the grid is observed in display 508.

Figure 6:
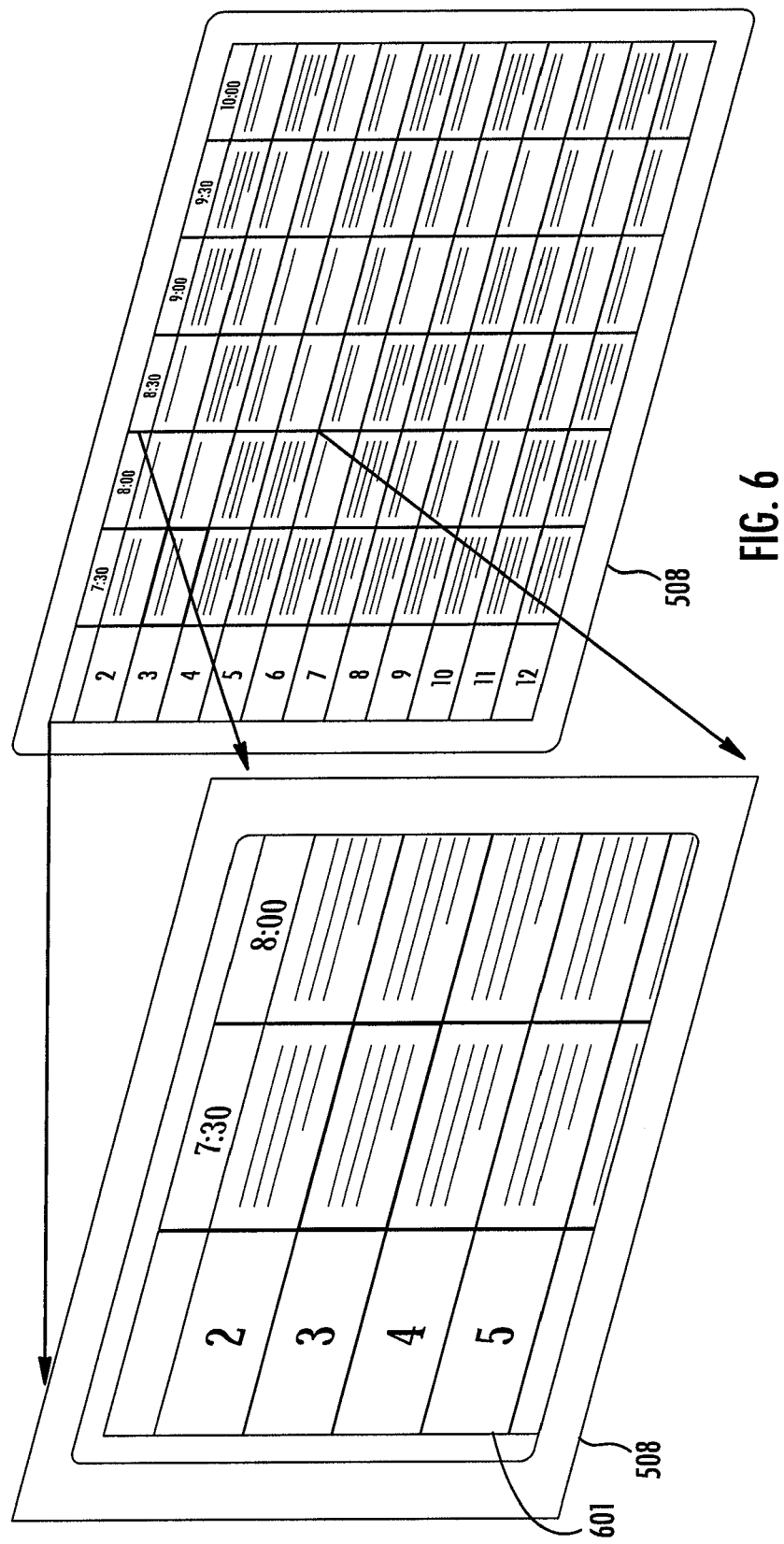
FIG. 6 is two perspective views of a display, schematically representing movement in and magnification of a portion of a displayed program guide according to an exemplary embodiment.

Using the above scheme, remote control 502 may, in some cases, be used to magnify or de-magnify information displayed on television 508, and to move within the total of the data available for display when less than such amount is actually displayed, such that one or more portions of data logically adjacent to the displayed data are subsequently displayed. This scheme may be useful, for example, when using remote control 502 in conjunction with a program guide 601 that is displayed on television 508, as exemplified in FIGS. 6 and 6a. In this case, programming information may be arranged as in a typical program guide, in tabular fashion with axes related to time and channel. Alternatively, programming information can be grouped according to favorite programs of a user, by genre, subject matter, etc. Regardless of the manner in which programming information is arranged, remote control 502 may be used to de-magnify the display in order to locate a desired region in the data (e.g., by moving remote control 502 away from television 508, as in FIG. 5d), and then to move to (e.g., by rotating remote control 502 around transverse axis t and normal axis n) and magnify (e.g., by moving remote control 502 toward television 508) that region for eliciting further details related to the associated programming. In cases where less than all available data is displayed on television 508, a map 614 may be displayed that indicates the location of the presently viewed data within a more expansive set of data that includes the displayed data, or possibly within the total set of data available for display (e.g., as defined by the minimum allowable magnification). In other embodiments, content may be translated or magnified in a manner opposite to those described above; this would simulate, for example, the movement of one's hands in changing the position of material (e.g., a program guide in a newspaper) being viewed.

Figure 7:
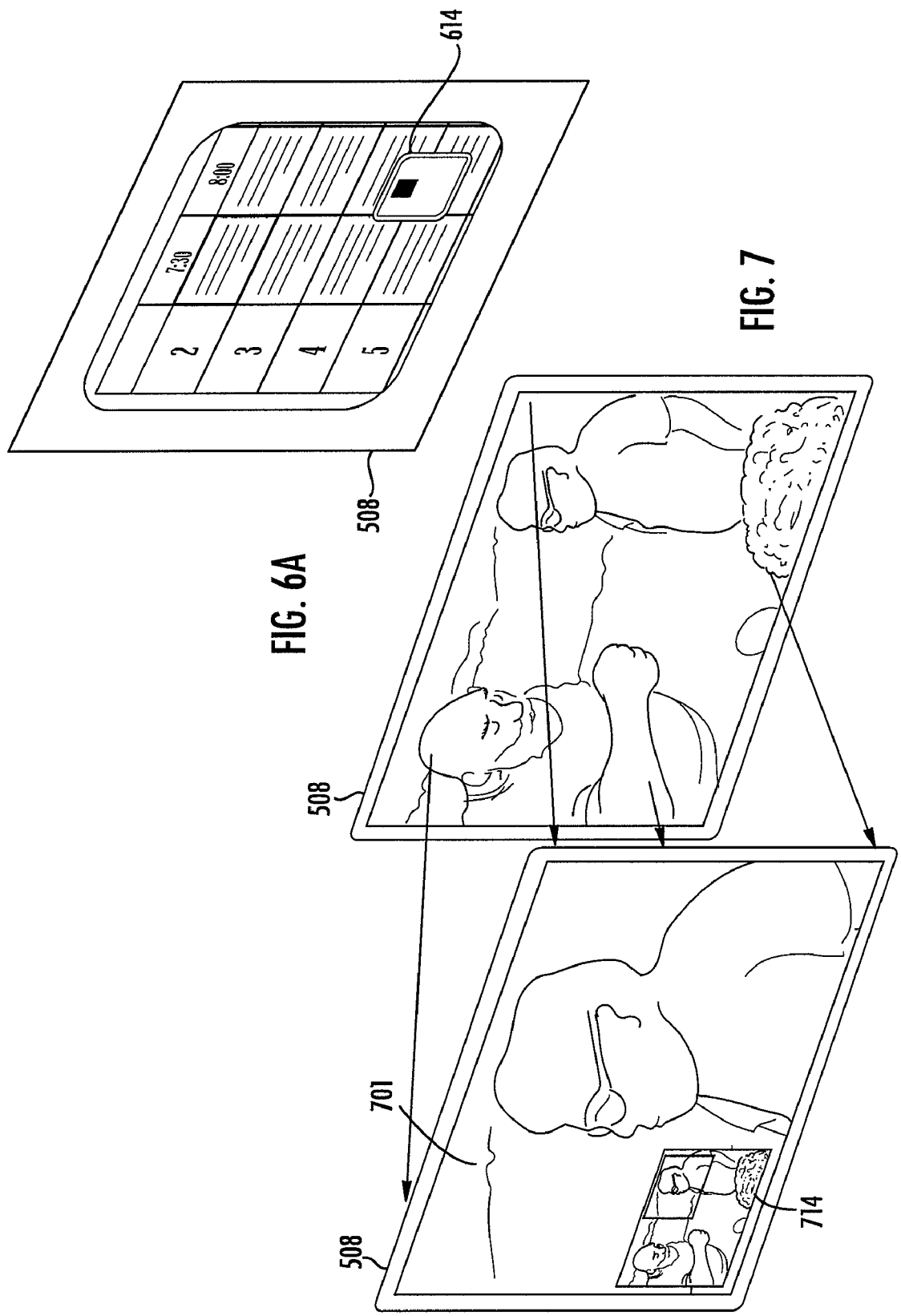
FIG. 7 is two perspective views of a display, schematically representing movement in and magnification of a portion of displayed program content according to exemplary embodiments.
Figure 8:
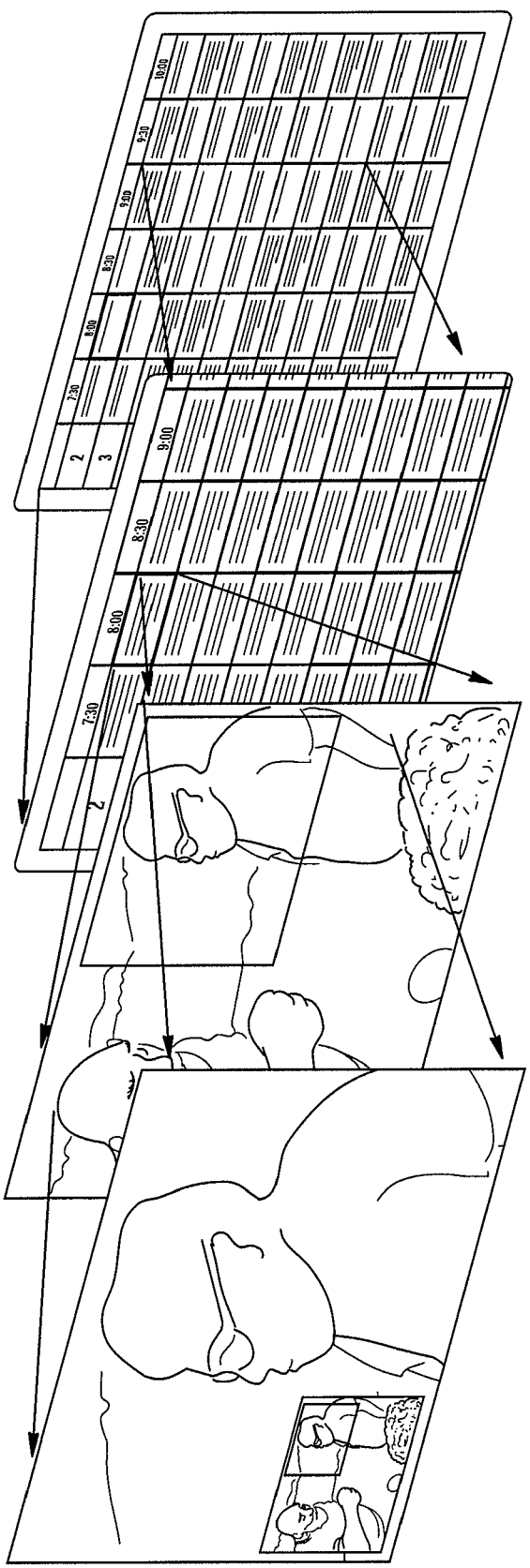
FIG. 8 is four perspective views of a display, schematically representing movement in and magnification of a portion of a displayed program guide, selection of a program, and movement in and magnification of a portion of displayed program content according to exemplary embodiments.

The remote control 502 and scheme for manipulating displayed data described in conjunction with FIGS. 5a-5d may also useful in conjunction with viewing of programming content 701, as exemplified in FIG. 7. A user may desire to magnify a picture, for example, because the user is visually impaired and/or deaf and reads the lips of the characters to follow the program and therefore is aided in viewing by a larger picture, or because the user would like a more detailed view of the display. In such cases, remote control 502 may be used to magnify a portion of the displayed program. As with the program guide, the location of displayed data within the extent of data available for display can be indicated with a map 714 that is, for example, displayed on television 508 with the program. Referring to FIG. 8, it may also be possible to utilize the translation and magnification capabilities of remote control 502 (FIGS. 5*a*-5*d*) in an integrated fashion when moving between program guide data and program content data. That is, remote control 502 may be utilized to scan a program guide, at varying magnifications, until a desired program is identified, and then to select that program for viewing. Once the program has been selected for viewing, a user may magnify the program to whatever extent is desired. In either case, any time a user is viewing less than all available data, a map can be included in the display (or elsewhere) to orient the user within the data.

While the above embodiment has been described as involving transmission of first, second, and third signals, it is not necessary that all three be transmitted at any one time or at all. A remote control may be configured to transmit only what is referred to as the third signal, such that there is no first or second signal. Further, in some embodiments, any or all of the signals may be transmitted at once, possibly in response to composite movements of a remote control (e.g. translating and rotating a remote control at the same time). In some cases, such signals may be embedded within one another, such as by frequency multiplexing of signals transmitted via infra red light.

Figure 9A:
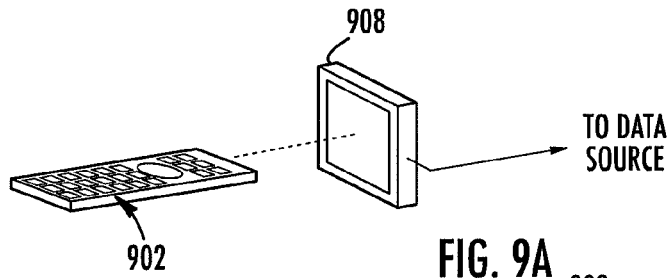
FIGS. 9a-9d are schematic perspective views of display control systems being integrated with existing display systems in accordance with exemplary embodiments.
Figure 9B:
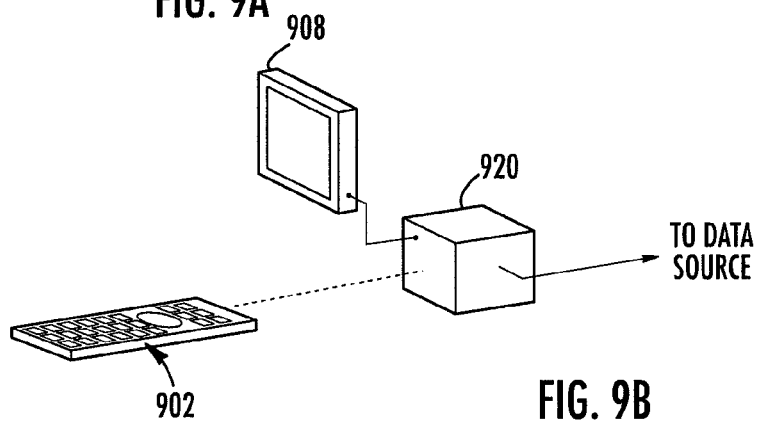

Referring to FIGS. 3 and 9*a*-9*b*, embodiments of remote control 902 may be used in conjunction with a separately produced/manufactured television and/or television programming distribution system (e.g., cable television, satellite television, etc.). In such cases, remote control 902 may include a memory 316 and a processor 318 capable of storing and executing software, respectively. Remote control 902 may, in some cases, be configured such that a user may select, either once or continuously, the type of device with which remote control 902 is to interface. Software would then allow processor 318 to appropriately modify or condition signals to be transmitted by transmitter 306 such that the signals could be received and understood by the television 908 and/or programming distribution system (e.g., the cable/satellite television transceiver 920) at issue. In some cases, this may allow remote control 902 to simulate, and thus possibly replace, a remote control device manufactured specifically for use with the television and/or programming distribution system at issue and for allowing horizontal and/or vertical scrolling functions in conjunction with a program guide or other display.

Figure 9C:
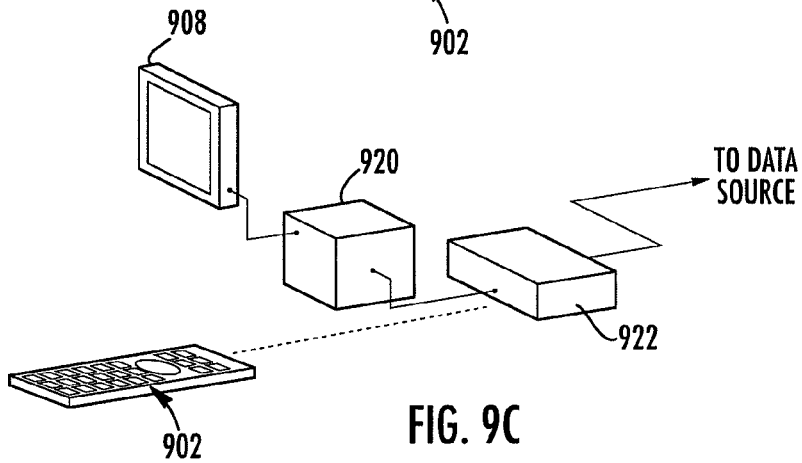
Figure 9D:
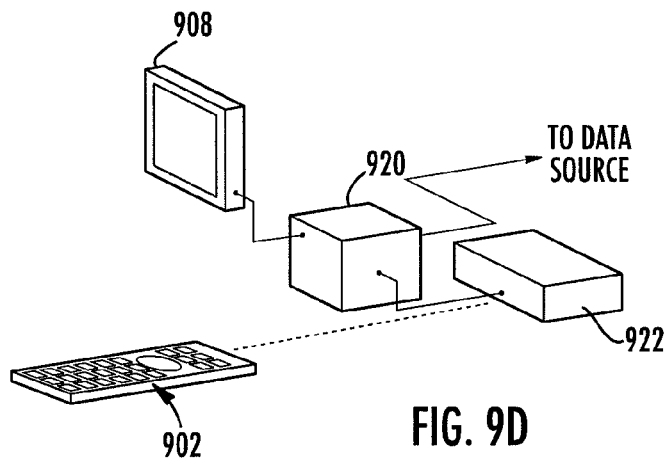
Figure 10:
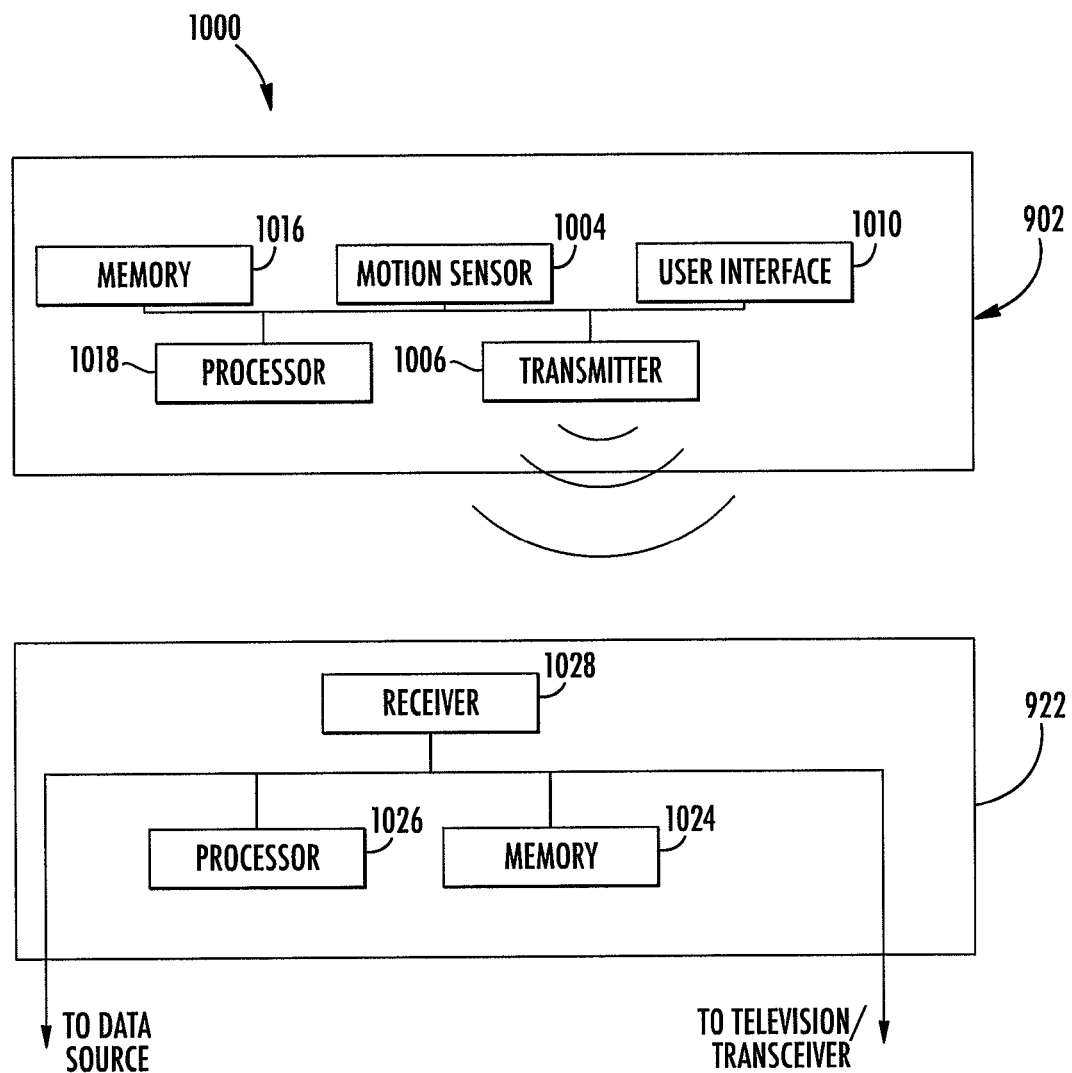
FIG. 10 is a block diagram of a display control system configured in accordance with another exemplary embodiment, the system including a remote control device and a processing device.

Referring to FIGS. 9*c*-9*d* and 10, remote control 902 may also be a component of a display control system 1000. In addition to remote control 902, system 1000 can include a processing device 922 configured to receive a signal transmitted from remote control 902 (i.e., by transmitter 1006, possibly in communication with motion sensor 1004, processor 1018, memory 1016, and/or user interface 1010). For example, processing device 922 may include a receiver 1028 that receives the signals transmitted by transmitter 1006. In response to receiving such signals, processing device 922 may initiate display changes in data displayed by a display device, such as television 908. In some embodiments, processing device 922, as well as television 908 and/or cable/satellite transceiver 920, may be spaced apart from remote control 902, such that remote control 902 affects the displayed data remotely.

Processing device 922 may communicate directly with a television 908, with a cable/satellite television transceiver 920, or with some other device that acts as an intermediary. For example, as shown in FIG. 9*c*, processing device 922 may communicate with transceiver 920 such that data received from a source is processed by processing device 922, in accordance with signals received from remote control 902, before reaching transceiver 920. In other embodiments, data may be first received by transceiver 920 before being communicated to processing device 922. Alternatively, as shown in FIG. 9*d*, data may pass from a data source to transceiver 920 and on to television 908, with processing device 922 separately communicating with transceiver 920 (in the illustrated embodiment, via a wireless link) in response to signals received from remote control 902. In some cases, processing device 922 may be capable of replacing transceiver 920 and providing a communication link between a data source and television 908, such as where processing device 922 is integrated with transceiver 920.

Processing device 922 may include a processor 1026, and may further include, or otherwise be in communication with, a memory 1024. In some embodiments, memory 1024 may store instructions executable on processor 1026 that allow processing device 922 to communicate with a variety of different televisions and/or transceivers. In other embodiments, instructions stored in memory 1024 may allow processor 1026 to receive raw signals from motion sensor 1004 and to discern movements of remote control 902 based on those signals, such that very little processing power is required within remote control 902. In general, processing may be distributed in any desired manner between remote control 902 and processing device 922.

One advantage offered by embodiments of the above described remote control and display control system is that the paradigm employed in searching data is similar to that naturally undertaken in manually browsing large areas of data for portions targeted for further examination. That is, people tend to view data broadly in order to categorize the information sufficiently to focus on the portion of most interest (e.g., when looking at a program guide in a newspaper, one might generally look at the times and dates to find the desired time, and then focus more closely to identify the desired channel). Accordingly, use of the above described embodiments is facilitated by the relationship to naturally employed searching techniques.

In the preceding specification, various embodiments of the claimed invention have been described. It will, however, be evident that various modifications and changes may be made thereunto without departing from the broader spirit and scope of the invention as set forth in the claims that follow. For example, while embodiments of the invention have been described as pertaining to a display system, other embodiments may be useful in controlling an audio system or some other type of system that may or may not disseminate content to a user. The specification and drawings are accordingly to be regarded in an illustrative rather than restrictive sense.

That which is claimed:

1. A system comprising:
   a remote control device including:
      a motion sensor for detecting and providing an indication of multiple types of movement of said remote control device;
      a transmitter for receiving the indication of the multiple types of movement and transmitting multiple signals corresponding to the multiple types of movement of said remote control device; and
   a processing device configured to receive the multiple signals and initiate display changes in data displayed by a display device;
   wherein said processing device:

receives the multiple signals transmitted by said remote control device while the data displayed by the display device includes program guide data of a program guide; and initiates one or more changes to the displayed program guide data in response to the multiple signals transmitted by said remote control device while the data displayed by the display device includes the program guide data of the program guide, the one or more changes including a magnification of a plurality of channels and times included in the program guide data displayed before the magnification, the magnification eliciting display of further details related to programming associated with the magnified plurality of channels and times.

2. A system according to claim 1, wherein said processing device and said display device are spaced apart from said remote control device.

3. A system according to claim 1, wherein said processing device is configured to couple to a display control system associated with the display device and provide input to the display control system so as to affect changes in the data displayed in the display device.

4. A system according to claim 3, wherein said remote control device defines orthogonal main and transverse axes, the main axis running along a length of said remote control device and the transverse axis oriented perpendicular to the main axis and in a plane roughly defined by an upper surface of said remote control device, said motion sensor is configured to provide an indication of rotation of said remote control device both around the transverse axis and around a normal axis perpendicular to a plane defined by the main and transverse axes, said transmitter is configured to transmit the multiple signals comprising at least first and second signals in response to the indications of remote control device rotation around the transverse and normal axes, respectively, and said processing device is configured to receive the first and second signals and provide first and second inputs to the display control system so as to respectively simulate vertical and horizontal scrolling functions utilized in conjunction with a program guide display by causing the display device to translate the displayed data in first and second lateral directions such that one or more portions of data logically adjacent to the displayed data are subsequently displayed.

5. A system according to claim 1, wherein said motion sensor includes one or more gyroscopes.

6. A system according to claim 5, wherein said remote control device defines orthogonal main and transverse axes, the main axis running along a length of said remote control device and the transverse axis oriented perpendicular to the main axis and in a plane roughly defined by an upper surface of said remote control device, said one or more gyroscopes are configured to provide an indication of rotation of said remote control device both around the transverse axis and around a normal axis perpendicular to a plane defined by the main and transverse axes, said transmitter is configured to transmit the multiple signals comprising first and second signals in response to the indications of remote control device rotation around the transverse and normal axes, respectively, and said processing device is configured to receive the first and second signals and cause the display device to translate the displayed data in respective first and second lateral directions such that one or more portions of data logically adjacent to the displayed data are subsequently displayed.

7. A system according to claim 6, wherein said one or more gyroscopes are configured to provide an indication of translation of said remote control device along the main axis, said transmitter is configured to transmit the multiple signals further comprising a third signal in response to the indication of remote control device translation along the main axis, and said processing device is configured to receive the third signal and cause the display device to change a magnification of the displayed data.

8. A system according to claim 7, wherein said processing device is configured to cause the display device to display a map simultaneously with the displayed data that indicates a position of the displayed data within a more expansive set of data that includes the displayed data.

9. A system according to claim 5, wherein said motion sensor further includes a distance sensor in combination with the one or more gyroscopes.

10. A system according to claim 1, wherein the processing device:
receives a selection signal transmitted by said remote control device while the data displayed by the display device includes the magnified plurality of channels and times, the selection signal indicating a user selection of program content represented by the magnified plurality of channels and times;
initiates a display of the selected program content by the display device in response to the selection signal;
receives one or more movement-based signals transmitted by said remote control device while the program content is displayed by the display device; and
initiates one or more changes to the display of the program content in response to the one or more movement-based signals transmitted by said remote control device while the program content is displayed by the display device, the one or more changes including a magnification of a portion of the displayed program content.

11. A system according to claim 1, wherein said motion sensor includes a signal transceiver for interacting with a transponder to detect at least one of a position and a movement of said remote control device.

12. The system of claim 1, wherein the magnified plurality of channels and times is a subgroup of a plurality of channels and times included in the program guide data displayed on the display device before the magnification.

13. A method comprising:
providing a remote control device defining orthogonal main and transverse axes and configured to be movable by an individual user, the main axis running along a length of said remote control device and the transverse axis oriented perpendicular to the main axis and in a plane roughly defined by an upper surface of said remote control device;
detecting a rotation of the remote control device around the transverse axis and generating a first signal configured to cause program guide data displayed on a remote display device to scroll in a first direction;
detecting a rotation of the remote control device around a normal axis and generating a second signal configured to cause the displayed program guide data to scroll in a second direction, the normal axis being perpendicular to a plane defined by the main and transverse axes and the second direction being perpendicular to the first direction;
detecting a translation of the remote control device along the main axis and generating a third signal configured to cause a magnification of the displayed program guide data; and
transmitting the first, second, and third signals to cause the program guide data displayed on the remote display device to scroll in the first direction, the program guide data displayed on the remote display device to scroll in the second direction, and the magnification of the displayed program guide data, the magnification magnifying a plurality of channels and times included in the program guide data displayed before the magnification and eliciting display of further details related to programming associated with the magnified plurality of channels and times.

14. A method according to claim 13, further comprising providing an indicator of the display device and adjusting the remote control device in response to the indicator of the display device such that signals transmitted by the remote control device are compatible with the display device.

15. The method of claim 13, wherein the magnified plurality of channels and times is a subgroup of a plurality of channels and times included in the program guide data displayed on the remote display device before the magnification.

16. A method of aiding a user in viewing content, the method comprising:

providing, by a processing device, program guide data of a program guide for display by a display device;

receiving, by the processing device while the program guide data is displayed, signals from a motion-based remote control device, the signals transmitted by the motion-based remote control device in response to movement of the motion-based remote control device while the program guide data is displayed;

initiating, by the processing device in response to the receiving of the signals, changes to the display of the program guide data by the display device, the changes including a vertical scrolling of the program guide, a horizontal scrolling of the program guide, and a magnification of a subset region of the displayed program guide data, the magnification magnifying a plurality of channels and times included in the subset region of the displayed program guide data and eliciting display of further details of programming associated with the magnified plurality of channels and times included in the subset region of the displayed program guide data;

receiving, by the processing device, a selection signal from the motion-based remote control device, the selection signal indicating a selection of a program within the programming associated with the magnified plurality of channels and times included in the subset region of the displayed program guide data for viewing;

providing, by the processing device, program content data of the selected program for display by the display device;

receiving, by the processing device while the program content data is displayed, additional signals from the motion-based remote control device, the additional signals transmitted by the motion-based remote control device in response to movement of the motion-based remote control device while the program content data is displayed; and initiating, by the processing device, changes to the display of the program content data by the display device, the changes including a magnification of a subset region of the program content data.

17. The method of claim 16, wherein the magnified subset region of the selected program contains magnified lips of a character of the selected program, the magnified lips configured to aid the user in reading the lips to follow the program.

18. The method of claim 16, wherein a remote control motion-based scheme for manipulating displayed data is consistent between the display of the program guide data and the display of the program content data.

19. The method of claim 16, wherein the magnified plurality of channels and times is a subgroup of a plurality of channels and times included in the program guide data displayed on the display device before the magnification.

\* \* \* \* \*